(12) United States Patent
Li (10) Patent No.: US 12,556,980 B2
(45) Date of Patent: Feb. 17, 2026

(54) CELL ACCESS METHOD, DEVICE AND SYSTEM

(71) Applicant: VIVO MOBILE COMMUNICATION CO., LTD., Dongguan (CN)

(72) Inventor: Zhonghuang Li, Dongguan (CN)

(73) Assignee: VIVO MOBILE COMMUNICATION CO., LTD., Guangdong (CN)

(*) Notice: Subject to any disclaimer, the term of this patent is extended or adjusted under 35 U.S.C. 154(b) by 700 days.

(21) Appl. No.: 17/965,981

(22) Filed: Oct. 14, 2022

(65) Prior Publication Data

US 2023/0032951 A1 Feb. 2, 2023

Related U.S. Application Data

(63) Continuation of application No. PCT/CN2021/087692, filed on Apr. 16, 2021.

(30) Foreign Application Priority Data

Apr. 17, 2020 (CN) .......................... 202010306530.4

(51) Int. Cl.
*H04W 36/00* (2009.01)
*H04W 36/08* (2009.01)

(52) U.S. Cl.
CPC .... *H04W 36/0055* (2013.01); *H04W 36/0011* (2013.01); *H04W 36/00698* (2023.05); *H04W 36/08* (2013.01)

(58) Field of Classification Search
CPC ......... H04W 36/0055; H04W 36/0011; H04W 36/00698; H04W 36/08; H04W 88/06

(Continued)

(56) References Cited

U.S. PATENT DOCUMENTS 10,440,772 B2 10/2019 Shi et al.
10,897,715 B2 1/2021 Quan et al.
(Continued)

FOREIGN PATENT DOCUMENTS

CN 107548095 A 1/2018
CN 109982360 A 7/2019
(Continued)

OTHER PUBLICATIONS

CATT, RRC connection reconfiguration procedure in NSA, 3GPP TSG-RAN WG2 Meeting #NR AH2, Jun. 27-29, 2017, R2-1706399 (revision of R2-1704232), Qingdao, China.

(Continued)

*Primary Examiner* — Marcos Batista
(74) *Attorney, Agent, or Firm* — The Webb Law Firm (57) ABSTRACT

A cell access method includes: receiving configuration information of a second cell sent by a first network device when a UE accesses a first cell; according to the configuration information of the second cell, sending first indication information to the first network device and executing a process of accessing the second cell, where the first indication information is used for indicating that the UE has not completed accessing the second cell and used for the first network device to maintain data transmission in the first cell; sending second indication information to the first network device when the UE has successfully accessed the second cell and the second cell satisfies a preset condition. The second indication information is used for indicating that the UE has successfully accessed the second cell and used for the first network device to switch a data transmission path from the first cell to the second cell.

20 Claims, 5 Drawing Sheets

(58) Field of Classification Search
USPC .......................................... 370/331; 455/312
See application file for complete search history.

(56) References Cited

U.S. PATENT DOCUMENTS

| | | | |
|---|---|---|---|
| 11,246,074 B2 | 2/2022 | Yan et al. | |
| 2015/0215826 A1 | 7/2015 | Yamada | |
| 2015/0358940 A1* | 12/2015 | Zhang | H04W 8/005 370/312 |
| 2017/0127331 A1* | 5/2017 | Wu | H04W 76/27 |
| 2019/0037450 A1 | 1/2019 | Chang et al. | |
| 2019/0104452 A1 | 4/2019 | Park | |
| 2019/0191348 A1 | 6/2019 | Futaki et al. | |
| 2022/0014989 A1 | 1/2022 | Zhang | |
| 2022/0201643 A1 | 6/2022 | Yang | |

FOREIGN PATENT DOCUMENTS

| | | | |
|---|---|---|---|
| CN | 110493892 A | 11/2019 | |
| CN | 110832946 A | 2/2020 | |
| CN | 110972214 A | 4/2020 | |
| CN | 110972223 A | 4/2020 | |
| CN | 110199542 B | 3/2022 | |
| CN | 111526551 B | 3/2022 | |
| EP | 3796711 A1 | 3/2021 | |
| JP | 2019510432 A | 4/2019 | |
| KR | 1020170057835 A | 5/2017 | |
| WO | 2018148325 A1 | 8/2018 | |
| WO | 2018203702 A1 | 11/2018 | |
| WO | 2019218990 A1 | 11/2019 | |
| WO | WO-2020062376 A1 * | 4/2020 | ........ H04W 36/0069 |

OTHER PUBLICATIONS

Chen, Xiao et al., Analysis of 5G-NSA Access Process and Four-Step Approach of Locating Problem, 2019, pp. 37-41, Guangzhou Branch of China Telecom Co., Ltd. with abstract.

Ericsson, 0 ms interruption support during handover procedure in NR, 3GPP TSG-RAN WG2 NR AH#2, Jun. 27-29, 2017, Tdoc R201706625 (Revision of R21704434), Qingdao, China.

ETRI, Conditional Make-Before-Break Handover, 3GPP TSG-RAN WG2 Meeting #104, Nov. 12-16, 2018, R2-1818046 (Revision of R2-1815243), Spokane, USA.

Huawei, Cell selection for NR non-standalone and NP standalone UE operation, 3GPP TSG-RAN WG2 Meeting #96, Nov. 14-18, 2016, R2-168569, Reno, Nevada.

Vodaphone Group, Energy Efficiency Solution for 3X Dual Connectivity Architecture, 3GPP TSG-RAN WG3 #97bis, Oct. 9-13, 2017, R3-173877, Prague, Czech Republic.

Zhang, Suo Xing et al., 5G Access Networking Scheme in Different Scenarios, Information & Communications, 2020, pp. 219-220 with abstract.

* cited by examiner

CELL ACCESS METHOD, DEVICE AND SYSTEM

CROSS-REFERENCE TO RELATED APPLICATIONS

This application is a Bypass Continuation Application of PCT/CN2021/087692 filed Apr. 16, 2021, which claims priority to Chinese Patent Application No. 202010306530.4 filed Apr. 17, 2020, the disclosures of which are hereby incorporated by reference in their entirety.

BACKGROUND OF THE INVENTION

Field of the Invention

Embodiments of the present disclosure relate to the field of communications technologies, and in particular, to a cell access method, a device, and a system.

Description of Related Art

At present, two ways are provided to deploy a 5G network. One is standalone (SA) and the other is non-standalone (NSA). The NSA deploys the 5G network by using 4G network infrastructure. Generally, in a process of a user equipment (UE) accessing the 5G network through the NSA, a network device may send a measurement indication of a 5G cell to the UE connected to a 4G network, so that the UE may search for and measure the 5G cell, and report a measurement result to the network device, and then the network device may send a reconfiguration message (including the configuration information of the 5G cell) to the UE, so that the UE may send a reconfiguration complete message to the network device and attempt to access the 5G cell.

SUMMARY OF THE INVENTION

Embodiments of the present disclosure provide a cell access method, a device and a system.

According to a first aspect, an embodiment of the present disclosure provides a cell access method, performed by a UE, where the UE communicates with a first network device, the first network device being communicates with a second network device. The cell access method includes: receiving configuration information of a second cell sent by the first network device in a case that the UE accesses a first cell, where the first cell is a service cell of the first network device, and the second cell is a service cell of the second network device communicating with the first network device; according to the configuration information of the second cell sending first indication information to the first network device and executing a process of accessing the second cell, where the first indication information is used for indicating that the UE has not completed accessing the second cell, and the first indication information is used for the first network device to maintain data transmission in the first cell; and sending second indication information to the first network device in a case that the UE has successfully accessed the second cell and the second cell satisfies a preset condition, where the second indication information is used for indicating that the UE has successfully accessed the second cell, and the second indication information is used for the first network device to switch a data transmission path from the first cell to the second cell.

According to a second aspect, an embodiment of the present disclosure provides a cell access method, performed by a first network device. The cell access method includes: sending configuration information of a second cell to a UE in a case that the UE accesses a first cell, where the configuration information of the second cell is used for the UE to access the second cell, the first cell is a service cell of the first network device, and the second cell is a service cell of a second network device communicating with the first network device; receiving first indication information sent by the UE, and maintaining data transmission in the first cell according to the first indication information, where the first indication information is used for indicating that the UE has not completed accessing the second cell; and receiving second indication information sent by the UE and switching a data transmission path from the first cell to the second cell according to the second indication information, where the second indication information is used for indicating that the UE has successfully accessed the second cell.

According to a third aspect, an embodiment of the present disclosure provides a UE. The UE may include: a receiving module, a sending module and an execution module. The receiving module is configured to receive configuration information of a second cell sent by a first network device in a case that the UE accesses a first cell, where the first cell is a service cell of the first network device, and the second cell is a service cell of a second network device communicating with the first network device. The sending module is configured to send first indication information to the first network device according to the configuration information of the second cell received by the receiving module, where the first indication information is used for indicating that the UE has not completed accessing the second cell, and the first indication information is used for the first network device to maintain data transmission in the first cell. The execution module is configured to execute a process of accessing the second cell. The sending module is further configured to send second indication information to the first network device in a case that the UE has successfully accessed the second cell and the second cell satisfies a preset condition, where the second indication information is used for indicating that the UE has successfully accessed the second cell, and the second indication information is used for the first network device to switch a data transmission path from the first cell to the second cell.

According to a fourth aspect, an embodiment of the present disclosure provides a network device, the network device being a first network device. The network device may include: a sending module, a receiving module, a maintaining module and a switching module. The sending module is configured to send configuration information of a second cell to a UE in a case that the UE accesses a first cell, where the configuration information of the second cell is used for the UE to access the second cell, the first cell is a service cell of the first network device, and the second cell is a service cell of a second network device communicating with the first network device. The receiving module is configured to receive first indication information sent by the UE, where the first indication information is used for indicating that the UE has not completed accessing the second cell. The maintaining module is configured to maintain data transmission in the first cell according to the first indication information received by the receiving module. The receiving module is further configured to receive second indication information sent by the UE, where the second indication information is used for indicating that the UE has successfully accessed the second cell. The switching module is configured to switch a data transmission path from the first cell to the second cell according to the second indication information received by the receiving module.

According to a fifth aspect, an embodiment of the present disclosure provides a UE. The UE includes a processor, a memory and a computer program stored in the memory and executable on the processor. When the computer program is executed by the processor, the steps of the cell access method according to the foregoing first aspect are implemented.

According to a sixth aspect, an embodiment of the present disclosure provides a network device. The network device includes a processor, a memory and a computer program stored in the memory and executable on the processor. When the computer program is executed by the processor, the steps of the cell access method according to the foregoing second aspect are implemented.

According to a seventh aspect, an embodiment of the present disclosure provides a communication system. The communication system includes the UE according to the third aspect, and the network device according to the fourth aspect; or the communication system includes the UE according to the fifth aspect, and the network device according to the sixth aspect.

According to an eighth aspect, an embodiment of the present disclosure provides a non-transitory computer-readable storage medium, storing a computer program. When the computer program is executed by a processor, the steps of the cell access method according to the foregoing first aspect, or the steps of the cell access method according to the foregoing second aspect are implemented.

DESCRIPTION OF THE INVENTION

The following clearly describes the technical solutions in the embodiments of the present disclosure with reference to the accompanying drawings in the embodiments of the present disclosure. Apparently, the described embodiments are some of the embodiments of the present disclosure rather than all of the embodiments. All other embodiments obtained by a person of ordinary skill in the art based on the embodiments of the present disclosure shall fall within the protection scope of the present disclosure.

In the specification and claims of the embodiments of the present disclosure, the terms "first", "second", and the like are intended to distinguish between different objects but do not indicate a particular order of the objects. For example, a first threshold, a second threshold, and the like are used for distinguishing between different thresholds, but are not used for describing a particular order of the thresholds.

In the description of the embodiments of the present disclosure, unless otherwise stated, "a plurality of" means two or more. For example, a plurality of components means two or more components.

The term "and/or" in this specification describes an association relationship for describing associated objects and represents that three relationships may exist. For example, a display panel and/or backlight may represent the following three cases: Only a display panel exists, both a display panel and backlight exist, and only backlight exists. The symbol "/" in this specification represents that associated objects are in an "or" relationship. For example, input/output represents input or output.

In the embodiments of the present disclosure, the word "exemplary" or "for example" is used for representing giving an example, an illustration, or a description. Any embodiment or design scheme described as "exemplary" or "for example" in the embodiments of the present disclosure should not be explained as being more preferred or having more advantages than another embodiment or design scheme. Exactly, use of the word "exemplary" or "for example" or the like is intended to present a related concept in a specific manner.

The following describes some concepts and/or terms involved in a cell access method, a device and a system provided in the embodiments of the present disclosure.

A networking mode of non-standalone (NSA): Deployment of a 5G network may include two parts: a radio access network (RAN) and a core network. The radio access network mainly includes a base station, providing a radio access function for a user. The core network mainly provides an Internet access service, a corresponding management function, and the like for the user. Due to a huge investment in deploying a new network and a need to separately deploy the two parts, a standards organization 3rd generation partnership project (3GPP) divides two ways for deploying, namely, standalone (SA) and non-standalone (NSA). The SA refers to building an existing network, including a new base station, a backhaul link, and a core network. The NSA refers to using existing 4G infrastructure for the deployment of the 5G network. In an early stage of 5G networking, the NSA can use the resources of the existing 4G network to the maximum to achieve a purpose of rapidly deploying 5G. In a dual connectivity of an eNodeB (eNB) and a gNodeB (gNB), both a control plane and a user plane of the gNB access a core network device through the eNB, that is, signaling of the gNB is sent to a UE through the eNB.

The embodiments of the present disclosure provide a cell access method, a device and a system. Before the UE has successfully accessed a second cell, a piece of indication information may be first sent to a first network device to indicate the UE having not completed accessing the second cell to the first network device, so that the first network device may not switch a data transmission path, that is, continue to maintain data transmission in a first cell. Therefore, a problem of data interruption before the second cell is successfully accessed may be avoided. In addition, after the UE has successfully accessed the second cell, whether the second cell can communicate stably may be determined. Therefore, in a case that the second cell can communicate stably, a piece of indication information is sent to the first network device to indicate that the UE has successfully completed accessing the second cell and the second cell can communicate stably to the first network device, so that the first network device may switch the data transmission path, that is, switch to the second cell for data transmission. Therefore, a problem of data interruption and frequent network dropping/disconnection may be avoided, thereby ensuring the stability of UE data transmission, and improving the communication fluency.

The cell access method, the device and the system provided in the embodiments of the present disclosure may be applied to a communication system, and for example, to a process of accessing the second cell in a case that the UE accesses the first cell based on the communication system.

Figure 1:
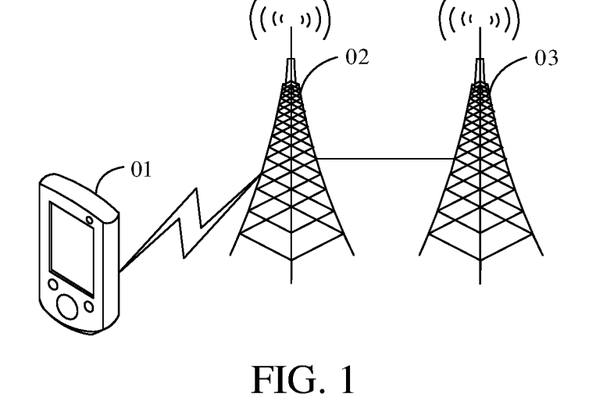
FIG. 1 is a schematic diagram of an architecture of a communication system according to an embodiment of the present disclosure.

For example, FIG. 1 is a schematic diagram showing an architecture of a communication system according to an embodiment of the present disclosure. As shown in FIG. 1, the communication system may include a UE 01, a network device 02 and a network device 03. The UE 01 may be connected to and in communication with the network device 02. The network device 02 may be connected to and in communication with the network device 03.

It should be noted that, the foregoing network device 02 and network device 03 shown in FIG. 1 may be in a wireless connection. To more clearly illustrate a connection relationship between the network device 02 and the network device 03, FIG. 1 illustrates the connection relationship between the network device 02 and the network device 03 by using a solid line.

A UE is a device that provides a user with voice and/or data connectivity, a handheld device with a wired/wireless connection function, or another processing device connected to a wireless modem. The UE may be in communication with one or more core network devices through a RAN.

The UE in this embodiment of the present disclosure may be a mobile UE or a non-mobile UE. For example, the mobile UE may be a mobile phone (or referred to as a "cellular" phone) and a computer (such as a tablet computer, a notebook computer and a palmtop computer) with the mobile UE, or may be a portable, pocket-sized, handheld, computer built-in, or in-vehicle mobile apparatus, which exchanges voice and/or data with the RAN, and, for example, may be a device such as a personal communication service (PCS) phone, a cordless phone, a Session Initiation Protocol (SIP) phone, a wireless local loop (WLL) station, or a personal digital assistant (PDA). The non-mobile UE may be a personal computer (PC), a television (TV), a teller machine, a self-service machine, or the like. Details are not limited in this embodiment of the present disclosure.

The UE in this embodiment of the present disclosure may be a UE with an operating system. The operating system may be an Android operating system, an iOS operating system, or another possible operating system. Details are not limited in this embodiment of the present disclosure. For example, an architecture of the Android operating system includes four layers, respectively being: an application layer, an application framework layer, a system operating library layer, and a kernel layer (being a Linux kernel layer).

The application layer includes various applications (including a system application and a third-party application) in the Android operating system. The application framework layer is a framework of an application. A developer may develop some applications based on the application framework layer under a condition that a development principle of the framework of the application is followed. The system operating library layer includes a library (also referred to as a system library) and an Android operating system operating environment. The library mainly provides various resources required by the Android operating system. The Android operating system operating environment is configured to provide a software environment for the Android operating system. The kernel layer is an operating system layer of the Android operating system and is a bottom layer of the Android operating system software layer. The kernel layer provides a core system service and a hardware-related driver for the Android operating system based on a Linux kernel.

Taking the Android operating system for example, in this embodiment of the present disclosure, the developer may develop a software program implementing the cell access method provided in this embodiment of the present disclosure based on the foregoing system architecture of the Android operating system. Therefore, the cell access method may be operated based on the foregoing Android operating system. That is, a processor or the UE may implement the cell access method provided in this embodiment of the present disclosure by operating the software program in the Android operating system.

The network device may be a base station (for example, a master base station or a slave base station). The base station is an apparatus deployed in the RAN and configured to provide a wireless communication function for the UE. The base station may include a macro base station, a micro base station, a relay station, an access point, and the like in various forms. In a system using different radio access technologies, devices having a base station function may have different names. For example, the network device 02 may be a base station in a long term evolution (LTE) system, which may be referred to as an evolved NodeB (eNB or eNodeB). The network device 03 may be a base station in the 5th generation mobile communication (5G) network, which may be referred to as a gNB. With the evolution of communication technologies, the name "base station" may change. It should be noted that, in this embodiment of the present disclosure, the 4G network and the 5G network are merely used for exemplary description, and should not be used as a scenario limitation of this embodiment of the present disclosure.

It should be noted that, Both the eNB and the gNB communicate with an LTE core network. The eNB is a master eNB(MeNB) and the gNB is a slave eNB (SeNB). The eNB and the gNB communicate with each other through an Xx interface. S1-C on the control plane is terminated in the eNB, and control plane information between the eNB and the gNB is interacted with each other through the Xx-C interface. The user plane has different user plane protocol architectures in different dual connectivity modes. A data plane radio bearer may be served independently by the MeNB or the SeNB, or may be served by the MeNB and the SeNB simultaneously.

With reference to the accompanying drawings, the following describes the cell access method, the device and the system provided in the embodiments of the present disclosure through some embodiments and application scenarios thereof.

In a case that a UE accesses a 4G cell, when the UE attempts to access a 5G cell, a network device will reconfigure a data transmission path (for example, a data transmission path corresponding to the 5G cell), that is, the UE has currently been disconnected from a 4G network, and the UE sends a failure report to the network device only after several attempts to access the 5G cell have failed (for example, a cell signal is poor), and then the network device reconfigures the data transmission path (for example, a data transmission path corresponding to the 4G cell). Therefore, a problem of interruption of UE communication caused by interruption of network connection of the UE may exist.

To resolve the foregoing technical problems, in this embodiment of the present disclosure, before the UE has successfully accessed the 5G cell, the UE may first send a piece of indication information to a first network device, to inform the first network device that the UE has not been switched to the data transmission path corresponding to the 5G network, so that the first network device may continue to send data to the UE on the data transmission path corresponding to the 4G network (that is, avoid interruption of 4G network connection), and then the UE may perform a random process of accessing the 5G cell, and evaluate the cell according to some network parameters (such as a signal value and whether a radio link failure occurs) of the 5G cell, to indicate that the 5G cell is successfully accessed and can communicate normally to the first network device in a case that the evaluation passes, so that the first network device may switch from the data transmission path corresponding to the 4G network to the data transmission path corresponding to the 5G network to send data. In this way, a case that the connection of the 4G network is interrupted before the UE has successfully accessed the 5G cell may be avoided, thereby ensuring the stability of data transmission between the UE and the first network device.

Figure 2:
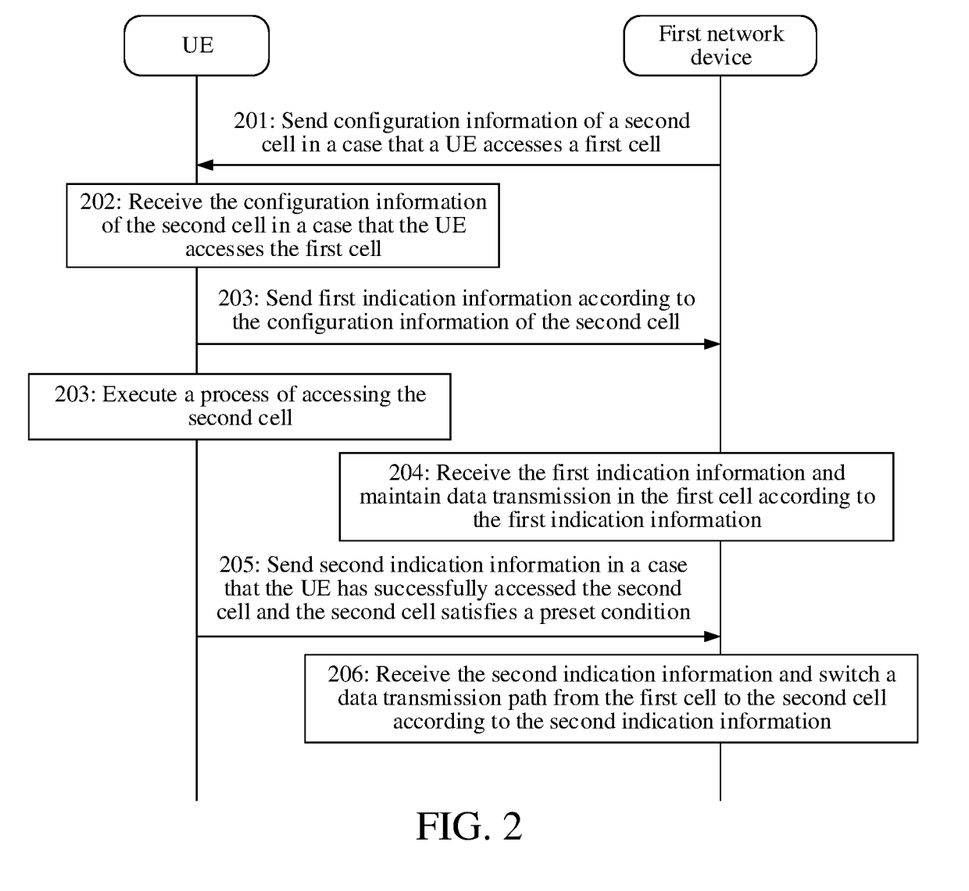
FIG. 2 is a flowchart 1 of a cell access method according to an embodiment of the present disclosure.

Based on the communication system shown in FIG. 1, an embodiment of the present disclosure provides a cell access method. As shown in FIG. 2, the cell access method may include the following steps 201 to step 206.

Step 201: A first network device sends configuration information of a second cell to a UE when the UE accesses a first cell.

In this embodiment of the present disclosure, the foregoing configuration information of the second cell is used for the UE to access the second cell. The foregoing first cell is a service cell of the first network device and the foregoing second cell is a service cell of a second network device communicating with the first network device.

In this embodiment of the present disclosure, the UE may search for the first cell, and in a case that the first cell is found, send an attach request to the first network device (for example, an LTE base station). After receiving the attach request, the first network device may send a capability request (used for requesting to query capability of the UE) to the UE, so that the UE reports the capability of the UE to the first network device. The first network device may send an attach response to the UE according to the capability of the UE, so that the UE accesses the first cell.

In this embodiment of the present disclosure, in a case that the UE accesses the first cell, the first network device (for example, an LTE base station) may deliver a measurement indication of the second cell to the UE in the first cell. After the UE receives the measurement indication, the UE may search for the second cell (reading physical broadcast channel (PBCH)), and in a case that the second cell is found, measure the second cell and then the UE may report a measurement result (that is, a result of measuring the second cell) to the first network device. After receiving the measurement result, the first network device may send a second cell addition request (or referred to as a second cell access request) to the second network device (for example, a gNB). Therefore, the second network device may send cell information, bearer information and the like of the second cell to the first network device, and then the first network device may send uplink/downlink configuration information of the second cell to the UE, so that the UE may attempt to access the second cell.

Figure 3:
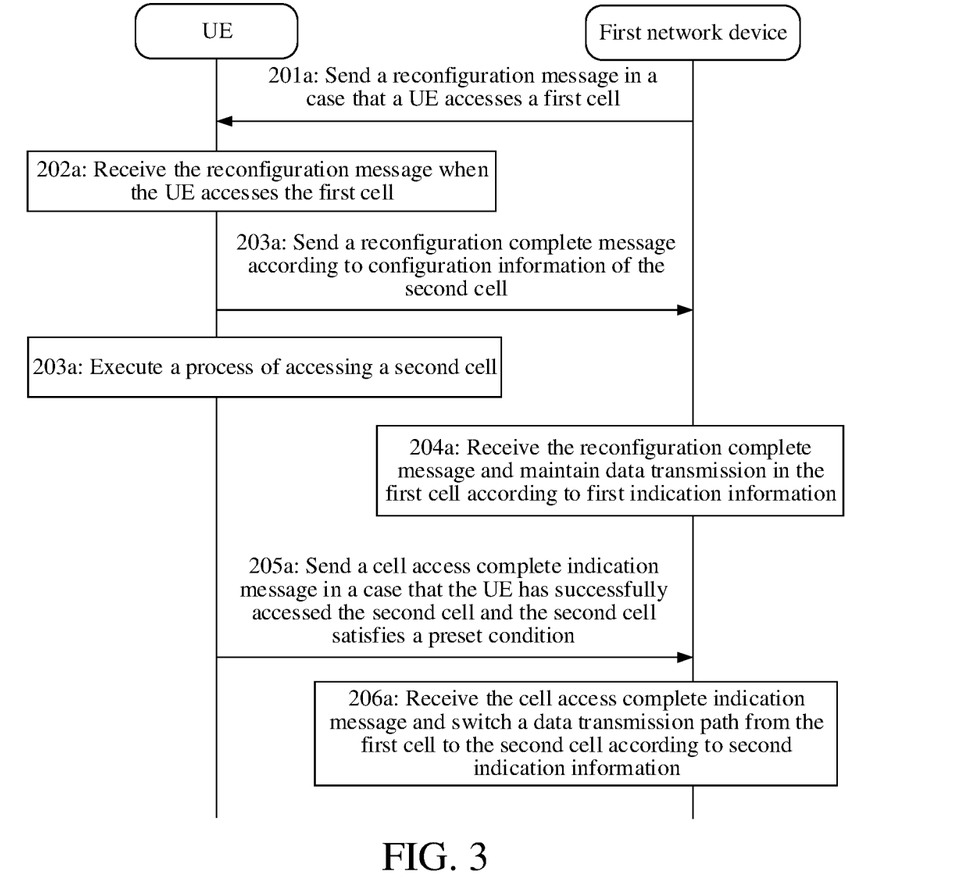
FIG. 3 is a flowchart 2 of a cell access method according to an embodiment of the present disclosure.

Optionally, in this embodiment of the present disclosure, with reference to FIG. 2, as shown in FIG. 3, the foregoing step 201 may be implemented through the following step 201a.

Step 201a: The first network device sends a reconfiguration message to the UE in a case that the UE accesses the first cell.

In this embodiment of the present disclosure, the foregoing reconfiguration message includes the configuration information of the second cell.

Optionally, in this embodiment of the present disclosure, the foregoing reconfiguration message may be a radio resource control (radio resource control, RRC) connection reconfiguration message.

Optionally, in this embodiment of the present disclosure, the foregoing first cell may be a 4G cell (or referred to as an LTE cell). The foregoing second cell may be a 5G cell (or referred to as a new radio (NR) cell). For example, the 5G cell may be a 5G secondary cell group (SCG). The foregoing configuration information of the second cell may be configuration information of the 5G SCG.

Step 202: The UE receives the configuration information of the second cell sent by the first network device in a case that the UE accesses the first cell.

Optionally, in this embodiment of the present disclosure, with reference to FIG. 2, as shown in FIG. 3, the foregoing step 202 may be implemented through the following step 202a.

Step 202a: The UE receives the reconfiguration message sent by the first network device in a case that the UE accesses the first cell.

Step 203: According to the configuration information of the second cell, the UE sends first indication information to the first network device and executes a process of accessing the second cell.

In this embodiment of the present disclosure, the foregoing first indication information is used for indicating that the UE has not completed accessing/adding the second cell, and the foregoing first indication information is used for the first network device to maintain data transmission in the first cell.

Optionally, in this embodiment of the present disclosure, with reference to FIG. 2, as shown in FIG. 3, the foregoing step 203 may be implemented through the following step 203a.

Step 203a: According to the configuration information of the second cell, the UE sends a reconfiguration complete message to the first network device and executes the process of accessing the second cell.

In this embodiment of the present disclosure, the foregoing reconfiguration complete message includes the first indication information.

In this embodiment of the present disclosure, the UE may check whether the reconfiguration message (that is, the configuration information of the second cell in the reconfiguration message) is normal (that is, check whether the first network device is configured with an abnormal parameter), and in a case that the reconfiguration message is normal, send the reconfiguration complete message to the first network device and the reconfiguration complete message carries the first indication information.

Optionally, in this embodiment of the present disclosure, the foregoing reconfiguration complete message may be an RRC connection reconfiguration complete (RRC connection reconfiguration complete) message.

Optionally, in this embodiment of the present disclosure, the foregoing first indication information may be a boolean field and a value of the boolean field is a first value.

Optionally, in this embodiment of the present disclosure, the value of the foregoing first indication information may be a value agreed with the first network device, being true. When a field received by the first network device is true, the first network device may learn that the UE has not completed accessing the second cell. Certainly, the value of the foregoing first indication information may alternatively be another value (for example, false), which may be determined according to an actual usage requirement. Details are not limited in this embodiment of the present disclosure.

Optionally, in this embodiment of the present disclosure, in a case that the UE has completed accessing the second cell, the UE may send a piece of indication information (for example, a value of the indication information may be false) to the first network device, to indicate the UE having completed accessing the second cell to the first network device, so that the first network device may perform data transmission (that is, send data on a newly configured uplink and downlink channel) in the second cell.

Optionally, in this embodiment of the present disclosure, the UE may perform random access in the second cell to implement accessing the second cell.

It should be noted that, the foregoing first indication information may alternatively be referred to as data transmission path unchanged indication information (for example, SCG-configuration on going-r15 indication information), which is used for indicating the data transmission path being unchanged to the first network device, that is, continue/keep in the data transmission in the first cell.

It may be understood that, before the UE has successfully accessed the second cell, the first indication information may be added to the reconfiguration complete message, which is used for informing the first network device that the UE currently has not completed adding the second cell, so that the UE and the first network device may continue to transmit data on the uplink and downlink data transmission path of the first cell.

Step 204: The first network device receives the first indication information sent by the UE and maintains data transmission in the first cell according to the first indication information.

Optionally, in this embodiment of the present disclosure, with reference to FIG. 2, as shown in FIG. 3, the foregoing step 204 may be implemented through the following step 204a.

Step 204a: The first network device receives the reconfiguration complete message sent by the UE and maintains the data transmission in the first cell according to the first indication information.

In this embodiment of the present disclosure, after receiving the first indication information, the first network device may learn that the UE currently has not completed accessing the second cell. Therefore, the first network device may not switch the uplink and downlink data transmission path, and continue to transmit data on the uplink and downlink data transmission path of the first cell.

Step 205: The UE sends second indication information to the first network device in a case that the UE has successfully accessed the second cell and the second cell satisfies a preset condition.

In this embodiment of the present disclosure, the foregoing second indication information is used for indicating that the UE has successfully accessed the second cell, and the foregoing second indication information is used for the first network device to switch a data transmission path from the first cell to the second cell.

It may be understood that, after the UE has successfully accessed the second cell, data transmission may be performed in the second cell (that is, on the uplink and downlink data transmission path of the second cell).

In this embodiment of the present disclosure, after the UE has successfully accessed the second cell, a network condition of the second cell may be evaluated, that is, determine whether the second cell satisfies the preset condition, so as to determine whether the second cell can communicate stably.

Optionally, in this embodiment of the present disclosure, the foregoing preset condition may include at least one of the following: a reference signal receiving power (RSRP) value of the second cell being greater than or equal to a first threshold (for example, −115 dbm); a reference signal receiving quality (RSRQ) value of the second cell being greater than or equal to a second threshold; a signal to noise ratio (SNR) of the second cell being greater than or equal to a third threshold (for example, 3 db); or no radio link failure (RLF) existing in the second cell within a preset duration.

Optionally, in this embodiment of the present disclosure, the foregoing RLF may be caused by at least one of the following: wireless interference, a cell warning, a network device failure, a UE failure, weak wireless network coverage, out-of-sync cell base stations, a full cell load, or the like.

Optionally, in this embodiment of the present disclosure, with reference to FIG. 2, as shown in FIG. 3, the foregoing step 205 may be implemented through the following step 205a.

Step 205a: The UE sends a cell access complete indication message to the first network device in a case that the UE has successfully accessed the second cell and the second cell satisfies the preset condition.

In this embodiment of the present disclosure, the foregoing cell access complete indication message includes the second indication information.

Optionally, in this embodiment of the present disclosure, the foregoing cell access complete indication message may be an SCG addition complete indication (SCG addition complete indication) message.

Optionally, in this embodiment of the present disclosure, the foregoing second indication information may be a cell access complete indication cause field and a value of the cell access complete indication cause field is a second value.

Optionally, in this embodiment of the present disclosure, the value of the foregoing second indication information may be a value agreed with the first network device, being normal. When a field received by the first network device is normal, the first network device may learn that the UE has successfully accessed the second cell. Certainly, the value of the foregoing second indication information may alternatively be another value (for example, fail), which is determined according to an actual usage requirement. Details are not limited in this embodiment of the present disclosure.

Optionally, in this embodiment of the present disclosure, in a case that the second cell does not satisfy the preset condition, the UE may send a piece of indication information (for example, a value of the indication information may be fail) to the first network device, to indicate the UE failing to access the second cell (that is, the second cell cannot communicate stably) to the first network device, so that the first network device releases the second cell and continues data transmission in the first cell.

It may be understood that, after the UE has successfully accessed the second cell, the second indication information may be added to the cell access complete indication message, which is used for informing the first network device that the UE has successfully completed accessing the second cell, so that the first network device may switch the uplink and downlink data transmission path to the second cell for data transmission.

Step 206: The first network device receives the second indication information sent by the UE and switches a data transmission path from the first cell to the second cell according to the second indication information.

It may be understood that, after the first network device switches the data transmission path from the first cell to the second cell, the UE may perform data interaction through the second cell and the second network device.

In this embodiment of the present disclosure, after receiving the second indication information, the first network device may learn that the UE has successfully accessed the second cell. Therefore, the first network device may switch the uplink and downlink data transmission path, switching from the uplink and downlink data transmission path of the first cell to the uplink and downlink data transmission path of the second cell, to implement the transmission of uplink and downlink data through the second network device.

Optionally, in this embodiment of the present disclosure, with reference to FIG. 2, as shown in FIG. 3, the foregoing step 206 may be implemented through the following step 206*a*.

Step 206*a*: The first network device receives the cell access complete indication message sent by the UE and switches the data transmission path from the first cell to the second cell according to the second indication information.

It may be understood that, in this embodiment of the present disclosure, in a 5G NSA mode, before the second cell (for example, 5G SCG) is successfully added, the UE may send the indication information to the first network device to make the first network device continue to maintain data interaction with the UE on the uplink and downlink data transmission path of the first cell (for example, the 4G network), avoiding a problem of data interruption caused by a plurality of failures of accessing the second cell due to the abnormality of the second cell or the poor signal of the second cell. In addition, a new RRC message is constructed between the UE and the first network device. After the UE has successfully accessed the second cell, a state of the second cell may be evaluated. The indication information is sent to the first network device through the new RRC message, to inform that the second cell has been successfully added and can communicate stably, so that the first network device may switch the uplink and downlink data transmission path to the uplink and downlink data transmission path of the second cell. In this way, a problem of data interruption and frequent network dropping/disconnection is avoided, ensuring the stability of UE data transmission, and improving the communication fluency in the NSA mode.

An embodiment of the present disclosure provides a cell access method. In a case that a UE accesses a first cell, according to configuration information of a second cell, the UE may send first indication information (indicating that the UE has not completed accessing the second cell) to a first network device, and execute a process of accessing the second cell, and then, in a case that the UE has successfully accessed the second cell and the second cell satisfies a preset condition, second indication information (indicating that the UE has successfully accessed the second cell) is sent to the first network device. Before the UE has successfully accessed the second cell, a piece of indication information may be first sent to the first network device to indicate the UE having not completed accessing the second cell to the first network device, so that the first network device may not switch a data transmission path, that is, continue to maintain data transmission in the first cell. Therefore, a problem of data interruption before the second cell is successfully accessed may be avoided. In addition, after the UE has successfully accessed the second cell, whether the second cell can communicate stably may be determined. Therefore, in a case that the second cell can communicate stably, a piece of indication information is sent to the first network device to indicate that the UE has successfully completed accessing the second cell and the second cell can communicate stably to the first network device, so that the first network device may switch the data transmission path, that is, switch to the second cell for data transmission. Therefore, a problem of data interruption and frequent network dropping/disconnection may be avoided, thereby ensuring the stability of UE data transmission, and improving the communication fluency.

Figure 4:
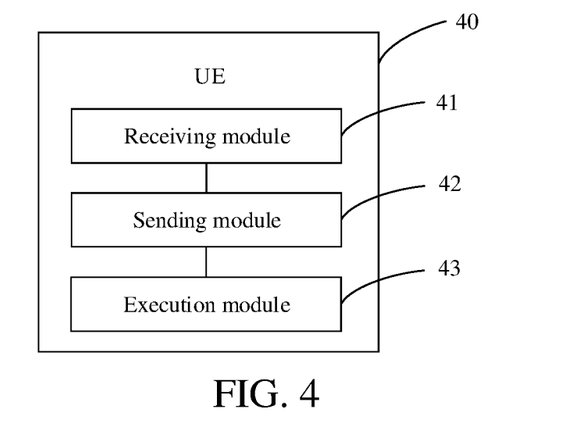
FIG. 4 is a schematic structural diagram of a UE according to an embodiment of the present disclosure.

FIG. 4 is a schematic diagram of a possible structure of a UE involved in this embodiment of the present disclosure. As shown in FIG. 4, a UE 40 may include: a receiving module 41, a sending module 42 and an execution module 43.

The receiving module 41 is configured to receive configuration information of a second cell sent by a first network device in a case that a UE accesses a first cell, where the first cell is a service cell of the first network device, and the second cell is a service cell of a second network device communicating with the first network device. The sending module 42 is configured to send first indication information to the first network device according to the configuration information of the second cell received by the receiving module 41, where the first indication information is used for indicating that the UE has not completed accessing the second cell, and the first indication information is used for the first network device to maintain data transmission in the first cell. The execution module 43 is configured to execute a process of accessing the second cell. The sending module 42 is further configured to send second indication information to the first network device in a case that the UE has successfully accessed the second cell and the second cell satisfies a preset condition, where the second indication information is used for indicating that the UE has successfully accessed the second cell, and the second indication information is used for the first network device to switch a data transmission path from the first cell to the second cell.

In a possible implementation, the foregoing receiving module 41 is further configured to receive a reconfiguration message sent by the first network device, where the reconfiguration message includes the configuration information of the second cell. The foregoing sending module 42 is further configured to send a reconfiguration complete message to the first network device, where the reconfiguration complete message includes the first indication information, and send a cell access complete indication message to the first network device, where the cell access complete indication message includes the second indication information.

In a possible implementation, the foregoing reconfiguration message may be an RRC connection reconfiguration message.

In a possible implementation, the foregoing reconfiguration complete message may be an RRC connection reconfiguration complete message.

In a possible implementation, the foregoing first indication information may be a boolean field and a value of the boolean field is a first value.

In a possible implementation, the foregoing second indication information may be a cell access complete indication cause field and a value of the cell access complete indication cause field is a second value.

In a possible implementation, the foregoing preset condition may include at least one of the followings: an RSRP value of the second cell being greater than or equal to a first threshold; an RSRQ value of the second cell being greater than or equal to a second threshold; an SNR of the second cell being greater than or equal to a third threshold; and no RLF existing in the second cell within a preset duration.

The UE provided in this embodiment of the present disclosure can implement various processes implemented by the UE in the foregoing method embodiment. To avoid repetition, details are not described herein again.

An embodiment of the present disclosure provides a UE. Before the UE has successfully accessed a second cell, a piece of indication information may be first sent to a first network device to indicate the UE having not completed accessing the second cell to the first network device, so that the first network device may not switch a data transmission path, that is, continue to maintain data transmission in a first cell. Therefore, a problem of data interruption before the second cell is successfully accessed may be avoided. In addition, after the UE has successfully accessed the second cell, whether the second cell can communicate stably may be determined. Therefore, in a case that the second cell can communicate stably, a piece of indication information is sent to the first network device to indicate that the UE has successfully completed accessing the second cell and the second cell can communicate stably to the first network device, so that the first network device may switch the data transmission path, that is, switch to the second cell for data transmission. Therefore, a problem of data interruption and frequent network dropping/disconnection may be avoided, thereby ensuring the stability of UE data transmission, and improving the communication fluency.

Figure 5:
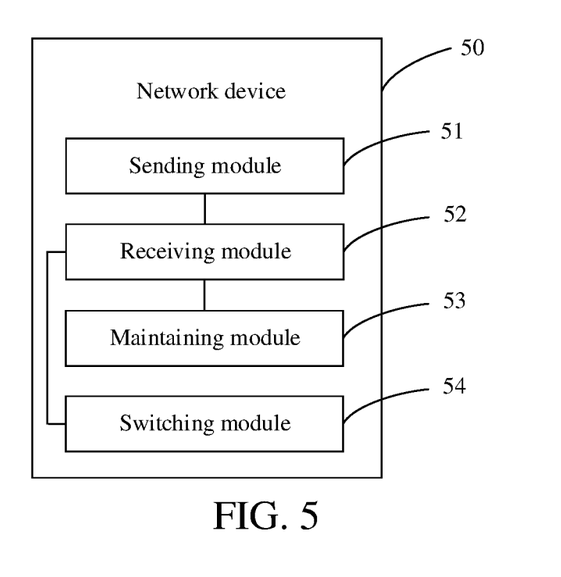
FIG. 5 is a schematic structural diagram of a network device according to an embodiment of the present disclosure.

FIG. 5 is a schematic structural diagram of a possible structure of a network device involved in an embodiment of the present disclosure. The network device is a first network device. As shown in FIG. 5, a network device 50 provided in this embodiment of the present disclosure may include: a sending module 51, a receiving module 52, a maintaining module 53 and a switching module 54.

The sending module 51 is configured to send configuration information of a second cell to a UE in a case that the UE accesses a first cell, where the configuration information of the second cell is used for the UE to access the second cell, the first cell is a service cell of the first network device and the second cell is a service cell of a second network device communicating with the first network device. The receiving module 52 is configured to receive first indication information sent by the UE, where the first indication information is used for indicating that the UE has not completed accessing the second cell. The maintaining module 53 is configured to maintain data transmission in the first cell according to the first indication information received by the receiving module 52. The receiving module 52 is further configured to receive second indication information sent by the UE, where the second indication information is used for indicating that the UE has successfully accessed the second cell. The switching module 54 is configured to switch a data transmission path from the first cell to the second cell according to the second indication information received by the receiving module 52.

In a possible implementation, the foregoing sending module 51 is further configured to send a reconfiguration message to the UE, where the reconfiguration message includes the configuration information of the second cell. The foregoing receiving module 52 is further configured to receive a reconfiguration complete message sent by the UE, where the reconfiguration complete message includes the first indication information, and receive a cell access complete indication message sent by the UE, where the cell access complete indication message includes the second indication information.

In a possible implementation, the foregoing reconfiguration message may be an RRC connection reconfiguration message.

In a possible implementation, the foregoing reconfiguration complete message may be an RRC connection reconfiguration complete message.

In a possible implementation, the foregoing first indication information may be a boolean field and a value of the boolean field is a first value.

In a possible implementation, the foregoing second indication information may be a cell access complete indication cause field and a value of the cell access complete indication cause field is a second value.

The network device provided in this embodiment of the present disclosure can implement various processes implemented by the first network device in the foregoing method embodiment. To avoid repetition, details are not described herein again.

An embodiment of the present disclosure provides a network device. Before a UE has successfully accessed a second cell, a first network device may not switch a data transmission path according to a piece of indication information (indicating that the UE has not completed accessing the second cell) sent by the UE, that is, continue to maintain data transmission in a first cell. Therefore, a problem of data interruption before the second cell is successfully accessed may be avoided. In addition, after the UE has successfully accessed the second cell, the first network device may switch the data transmission path according to a piece of indication information (indicating that the UE has successfully completed accessing the second cell and the second cell can communicate stably) sent by the UE, that is, switch to the second cell for data transmission. Therefore, a problem of data interruption and frequent network dropping/disconnection may be avoided, thereby ensuring the stability of UE data transmission, and improving the communication fluency.

Figure 6:
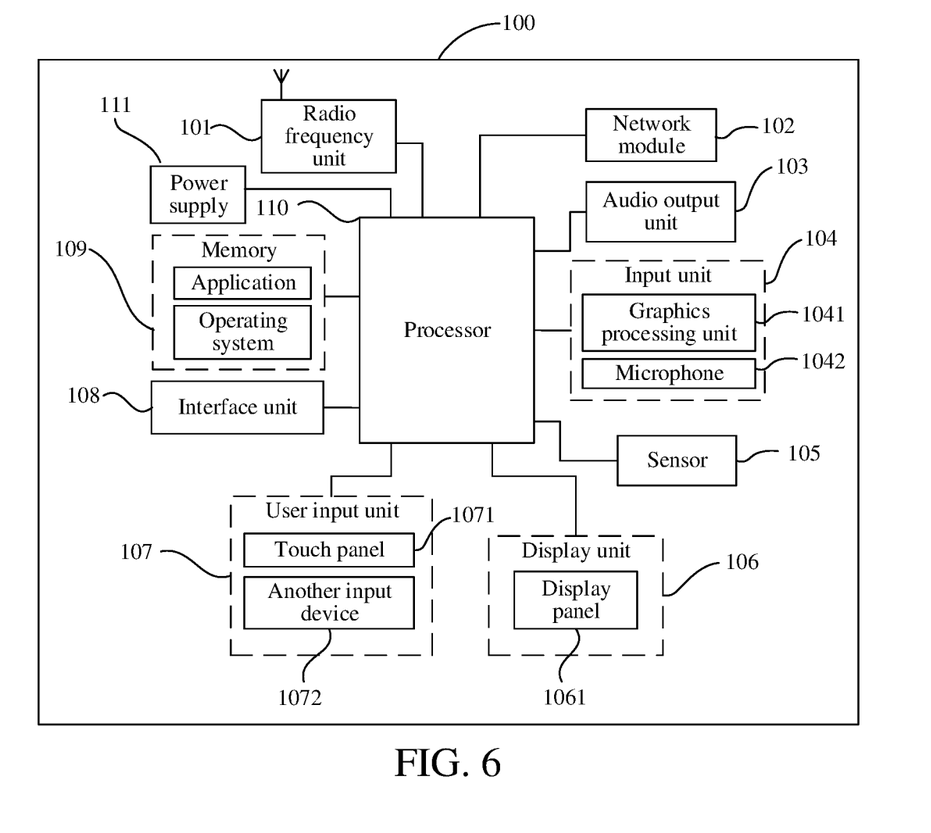
FIG. 6 is a schematic diagram of hardware of a UE according to an embodiment of the present disclosure.

FIG. 6 is a schematic diagram of hardware of a UE implementing various embodiments of the present disclosure. As shown in FIG. 6, a UE 100 includes but is not limited to: components such as a radio frequency unit 101, a network module 102, an audio output unit 103, an input unit 104, a sensor 105, a display unit 106, a user input unit 107, an interface unit 108, a memory 109, a processor 110, and a power supply 111.

It should be noted that, a person skilled in the art may understand that the UE structure shown in FIG. 6 does not constitute a limitation to the UE, and the UE may include more or fewer components than those shown in FIG. 6, or a combination of some components, or a deployment of different components. In this embodiment of the present disclosure, the UE includes, but is not limited to, a mobile phone, a tablet computer, a notebook computer, a palmtop computer, an in-vehicle terminal, a wearable device, a pedometer, and the like.

The radio frequency unit 101 is configured to receive configuration information of a second cell sent by a first network device in a case that a UE accesses a first cell, where the first cell is a service cell of the first network device, and the second cell is a service cell of a second network device communicating with the first network device, and send first indication information to the first network device according to the configuration information of the second cell, where the first indication information is used for indicating that the UE has not completed accessing the second cell, and the first indication information is used for the first network device to maintain data transmission in the first cell.

The processor 110 is configured to execute a process of accessing the second cell.

The radio frequency unit 101 is further configured to send second indication information to the first network device in a case that the UE has successfully accessed the second cell and the second cell satisfies a preset condition, where the second indication information is used for indicating that the UE has successfully accessed the second cell, and the second indication information is used for the first network device to switch a data transmission path from the first cell to the second cell.

An embodiment of the present disclosure provides a UE. Before the UE has successfully accessed a second cell, a piece of indication information may be first sent to a first network device to indicate the UE having not completed accessing the second cell to the first network device, so that the first network device may not switch a data transmission path, that is, continue to maintain data transmission in a first cell. Therefore, a problem of data interruption before the second cell is successfully accessed may be avoided. In addition, after the UE has successfully accessed the second cell, whether the second cell can communicate stably may be determined. Therefore, in a case that the second cell can communicate stably, a piece of indication information is sent to the first network device to indicate that the UE has successfully completed accessing the second cell and the second cell can communicate stably to the first network device, so that the first network device may switch the data transmission path, that is, switch to the second cell for data transmission. Therefore, a problem of data interruption and frequent network dropping/disconnection may be avoided, thereby ensuring the stability of UE data transmission, and improving the communication fluency.

It should be understood that, in this embodiment of the present disclosure, the radio frequency unit 101 may be configured to receive and send a signal during an information receiving and sending process or a call process. For example, downlink data from base station is processed by the processor 110 after being received by the radio frequency unit 101. In addition, uplink data is sent to the base station by the radio frequency unit 101. Generally, the radio frequency unit 101 includes, but is not limited to, an antenna, at least one amplifier, a transceiver, a coupler, a low noise amplifier, a duplexer, and the like. In addition, the radio frequency unit 101 may further communicate with another device through a wireless communication system and network.

The UE provides wireless broadband Internet access for a user by using the network module 102, such as helping the user to send and receive emails, browse web pages, and access streaming media.

The audio output unit 103 may convert audio data received by the radio frequency unit 101 or the network module 102 or stored in the memory 109 into an audio signal and output the audio signal as a sound. In addition, the audio output unit 103 may further provide an audio output (such as a call signal receiving sound or a message receiving sound) related to a particular function executed by the UE 100. The audio output unit 103 includes a speaker, a buzzer, a receiver, and the like.

The input unit 104 is configured to receive an audio or video signal. The input unit 104 may include a graphics processing unit (GPU) 1041 and a microphone 1042. The graphics processing unit 1041 performs processing on image data of a static picture or a video obtained by an image capture apparatus (for example, a camera) in a video capture mode or an image capture mode. A processed image frame may be displayed on the display unit 106. An image frame that has been processed by the graphics processing unit 1041 may be stored in the memory 109 (or another storage medium) or sent by using the radio frequency unit 101 or the network module 102. The microphone 1042 can receive sounds and can process such sounds as audio data. The processed audio data may be converted, in a phone call mode, into a format that can be sent by the radio frequency unit 101 to a mobile communication base station and be output.

The UE 100 further includes at least one sensor 105, such as an optical sensor, a motion sensor, or another sensor. The optical sensor includes an ambient light sensor and a proximity sensor. The ambient light sensor may adjust luminance of the display panel 1061 according to brightness of the ambient light. The proximity sensor may switch off the display panel 1061 and/or backlight when the UE 100 is moved to the ear. As one type of motion sensor, an acceleration sensor may detect magnitude of accelerations in various directions (generally on three axes), may detect magnitude and a direction of the gravity when static, and may be configured to recognize the attitude of the UE (such as, switching between landscape orientation and portrait orientation, a related game, and magnetometer attitude calibration), a function related to vibration recognition (such as a pedometer and a knock), and the like. The sensor 105 may further include a fingerprint sensor, a pressure sensor, an iris sensor, a molecular sensor, a gyroscope, a barometer, a hygrometer, a thermometer, an infrared sensor, and the like, which is not described in detail herein.

The display unit 106 is configured to display information inputted by the user or information provided for the user. The display unit 106 may include a display panel 1061. The display panel 1061 may be configured by using a liquid crystal display (LCD), an organic light-emitting diode (OLED), or the like.

The user input unit 107 may be configured to receive input digit or character information, and generate a key signal input related to the user setting and function control of the UE. The user input unit 107 includes a touch panel 1071 and another input device 1072. The touch panel 1071, also referred to as a touchscreen, may collect a touch operation of a user on or near the touch panel (such as an operation of a user on the touch panel 1071 or near the touch panel 1071 by using any suitable object or attachment, such as a finger or a stylus). The touch panel 1071 may include two parts: a touch detection apparatus and a touch controller. The touch detection apparatus detects a touch orientation of the user, detects a signal brought by the touch operation, and transmits the signal to the touch controller. The touch controller receives touch information from the touch detection apparatus, converts the touch information into contact point coordinates, and then sends the contact point coordinates to the processor 110. In addition, the touch controller receives and executes a command sent from the processor 110. In addition, the touch panel 1071 may be implemented by using various types, such as a resistive type, a capacitive type, an infrared type, and a surface acoustic wave type. In addition to the touch panel 1071, the user input unit 107 may further include the other input device 1072. Specifically, the another input device 1072 may include, but is not limited to, a physical keyboard, a functional key (such as a volume control key or a switch key), a track ball, a mouse, and a joystick, which are not described in detail herein.

Optionally, the touch panel 1071 may cover the display panel 1061. After detecting a touch operation on or near the touch panel 1071, the touch panel 1071 transfers the touch operation to the processor 110, to determine a type of a touch event. Then, the processor 110 provides a corresponding visual output on the display panel 1061 according to the type of the touch event. In FIG. 6, the touch panel 1071 and the display panel 1061 are used as two separate parts to implement input and output functions of the UE. However, in some embodiments, the touch panel 1071 and the display panel 1061 may be integrated to implement the input and output functions of the UE, which is not specifically limited herein.

The interface unit 108 is an interface for connecting an external apparatus and the UE 100. For example, the external apparatus may include a wired or wireless headset port, an external power supply (or battery charger) port, a wired or wireless data port, a memory card port, a port used for connecting an apparatus with an identification module, an audio input/output (I/O) port, a video I/O port, an earphone port, and the like. The interface unit 108 may be configured to receive an input (such as data information or electric power) from the external apparatus and transmit the received input to one or more elements in the UE 100 or may be configured to transmit data between the UE 100 and the external apparatus.

The memory 109 may be configured to store a software program and various data. The memory 109 may mainly include a program storage area and a data storage area. The program storage area may store an operating system, an application program required by at least one function (such as, a sound playing function and an image playing function), and the like. The data storage area may store data (such as, audio data and a phone book) created according to use of the mobile phone. In addition, the memory 109 may include a high-speed random access memory, and may further include a non-volatile memory, such as at least one magnetic disk storage device, a flash memory or another volatile solid-state storage device.

The processor 110 is a control center of the UE, connects all parts of the entire UE by using various interfaces and lines, and performs various functions and processes data by running or executing a software program and/or module stored in the memory 109 and by invoking data stored in the memory 109, thereby performing overall monitoring on the UE. The processor 110 may include one or more processing units. Optionally, the processor 110 may integrate an application processor and a modem processor. The application processor mainly processes an operating system, a user interface, an application program, and the like. The modem processor mainly processes wireless communication. It may be understood that the foregoing modem processor may either not be integrated into the processor 110.

The UE 100 may further include the power supply 111 (such as a battery) for supplying power to the components. Optionally, the power supply 111 may be logically connected to the processor 110 by using a power management system, thereby implementing functions such as charging, discharging, and power consumption management by using the power management system.

In addition, the UE 100 includes some unshown functional modules, which are not described in detail herein.

Optionally, an embodiment of the present disclosure further provides a UE, including, as shown in FIG. 6, a processor 110, a memory 109 and a computer program stored in the memory 109 and executable on the processor 110. When the computer program is executed by the processor 110, various processes of the foregoing method embodiment are implemented, and the same technical effects can be achieved. To avoid repetition, details are not described herein again.

An embodiment of the present disclosure further provides a non-transitory computer-readable storage medium, storing a computer program. When the computer program is executed by a processor, various processes of the foregoing method embodiment are implemented, and the same technical effects can be achieved. To avoid repetition, details are not described herein again. The non-transitory computer-readable storage medium is, for example, a read-only memory (ROM), a random access memory (RAM), a magnetic disk, an optical disc or the like.

Figure 7:
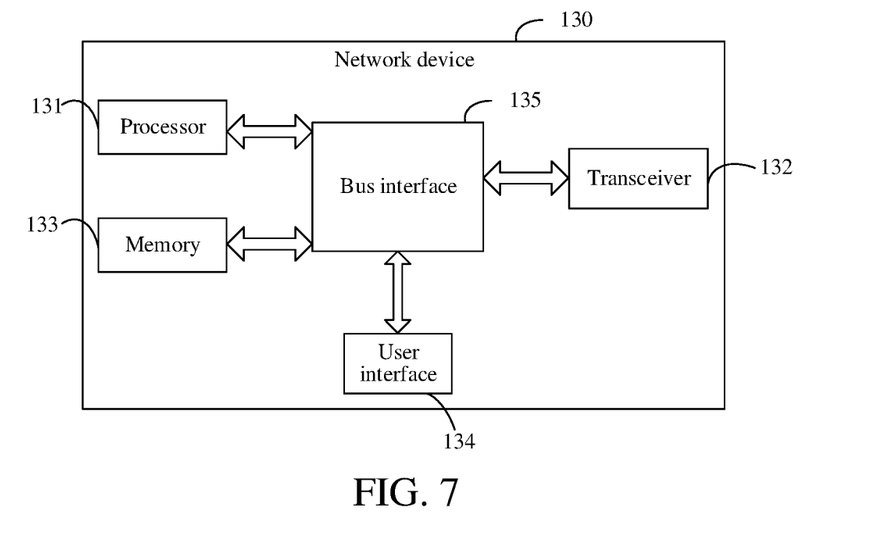
FIG. 7 is a schematic diagram of hardware of a network device according to an embodiment of the present disclosure.

FIG. 7 is a schematic diagram of hardware of a network device according to an embodiment of the present disclosure. As shown in FIG. 7, a network device 130 includes: a processor 131, a transceiver 132, a memory 133, a user interface 134 and a bus interface 135.

The transceiver 132 is configured to send configuration information of a second cell to a UE in a case that the UE accesses a first cell, where the configuration information of the second cell is used for the UE to access the second cell, the first cell is a service cell of a first network device and the second cell is a service cell of a second network device communicating with the first network device, and receive first indication information sent by the UE, where the first indication information is used for indicating that the UE has not completed accessing the second cell.

The processor 131 is configured to maintain data transmission in the first cell according to the first indication information.

The transceiver 132 is further configured to receive second indication information sent by the UE, where the second indication information is used for indicating that the UE has successfully accessed the second cell.

The processor 131 is further configured to switch a data transmission path from the first cell to the second cell according to the second indication information.

An embodiment of the present disclosure provides a network device. Before a UE has successfully accessed a second cell, a first network device may not switch a data transmission path according to a piece of indication information (indicating that the UE has not completed accessing the second cell) sent by the UE, that is, continue to maintain data transmission in a first cell. Therefore, a problem of data interruption before the second cell is successfully accessed may be avoided. In addition, after the UE has successfully accessed the second cell, the first network device may switch the data transmission path according to a piece of indication information (indicating that the UE has successfully completed accessing the second cell and the second cell can communicate stably) sent by the UE, that is, switch to the second cell for data transmission. Therefore, a problem of data interruption and frequent network dropping/disconnection may be avoided, thereby ensuring the stability of UE data transmission, and improving the communication fluency.

The processor 131 may be responsible for bus architecture management and general processing. The processor 131 may be configured to read and execute programs in the memory 133 to implement a processing function and a control on the network device 130. The memory 133 may store data used by the processor 131 when performing an operation. The processor 131 and the memory 133 may be jointly integrated, or may be independently disposed.

In this embodiment of the present disclosure, the network device 130 may further include: a computer program stored in the memory 133 and executable on the processor 131. When the computer program is executed by the processor 131, the steps of the cell access method provided in this embodiment of the present disclosure are implemented.

In FIG. 7, a bus architecture may include any quantity of interconnected buses and bridges. For example, various circuits of one or more processors represented by the processor 131 and memories represented by the memory 133 are connected together. The bus architecture may further connect various other circuits such as a peripheral device, a voltage regulator and a power management circuit. These are well known in the art, and therefore, no further description is provided in this embodiment of the present disclosure. The bus interface 135 provides an interface. The transceiver 132 may be a plurality of components, that is, including a transmitter and a receiver, and providing units for communicating with various other apparatuses on a transmission medium. For different UEs, the user interface 134 may further be an interface capable of externally and internally connecting required devices. The connected devices include but are not limited to a keypad, a display, a speaker, a microphone, a joystick and the like.

An embodiment of the present disclosure further provides a non-transitory computer-readable storage medium, storing a computer program. When the computer program is executed by the processor 131 shown in FIG. 7, various processes of the foregoing method embodiment are implemented, and the same technical effects can be achieved. To avoid repetition, details are not described herein again. The non-transitory computer-readable storage medium includes a ROM, a RAM, a magnetic disk, a compact disc or the like.

It should be noted that, the terms "include", "comprise", or any other variation thereof in this specification is intended to cover a non-exclusive inclusion, making a process, method, article or apparatus including a series of elements include not only those elements, but also other elements not expressly listed, or further elements inherent to such process, method, article or apparatus. Without more limitations, elements defined by the sentence "including one" does not exclude that there are still other same elements in the processes, methods, objects, or apparatuses.

Through the descriptions of the foregoing implementations, a person skilled in the art may clearly understand that the methods in the foregoing embodiments may be implemented through software and a necessary general hardware platform, and certainly, may further be implemented by hardware, but in many cases, the former manner is a better implementation. Based on such understanding, the technical solutions of the present disclosure or a part thereof that makes a contribution to the prior art may be essentially embodied in a form of a software product. The computer software product is stored in a storage medium (such as a ROM/RAM, a disk, and an optical disk), including several instructions to enable one terminal (which may be a mobile phone, a computer, a server, an air conditioner a network device, or the like) to perform the methods in the embodiments of the present disclosure.

The embodiments of the present disclosure are described above with reference to the accompanying drawings. However, the present disclosure is not limited to the foregoing specific implementations. The foregoing specific implementations are illustrative instead of limitative. Enlightened by the present disclosure, a person of ordinary skill in the art may make many forms without departing from the idea of the present disclosure and the scope of protection of the claims. All of the forms fall within the protection of the present disclosure.

What is claimed is:

1. A cell access method, performed by a user equipment (UE), wherein the UE communicates with a first network device, the first network device communicates with a second network device, and the method comprises:
   receiving configuration information of a second cell sent by the first network device in a case that the UE accesses a first cell, wherein the first cell is a service cell of the first network device, and the second cell is a service cell of the second network device;
   according to the configuration information of the second cell, sending first indication information to the first network device and executing a process of accessing the second cell, wherein the first indication information is used for indicating that the UE has not completed accessing the second cell, and the first indication information is used for the first network device to maintain data transmission in the first cell; and
   sending second indication information to the first network device in a case that the UE has successfully accessed the second cell and the second cell satisfies a preset condition, wherein the second indication information is used for indicating that the UE has successfully accessed the second cell, and the second indication information is used for the first network device to switch a data transmission path from the first cell to the second cell.

2. The method according to claim 1, wherein the receiving the configuration information of the second cell sent by the first network device comprises:
   receiving a reconfiguration message sent by the first network device, the reconfiguration message comprising the configuration information of the second cell;
   the sending the first indication information to the first network device comprises:
   sending a reconfiguration complete message to the first network device, the reconfiguration complete message comprising the first indication information; and
   the sending the second indication information to the first network device comprises:
   sending a cell access complete indication message to the first network device, the cell access complete indication message comprising the second indication information.

3. The method according to claim 1, wherein the first indication information is a boolean field and a value of the boolean field is a first value.

4. The method according to claim 1, wherein the second indication information is a cell access complete indication cause field and a value of the cell access complete indication cause field is a second value.

5. The method according to claim 1, wherein the preset condition comprises at least one of following:
   a reference signal receiving power (RSRP) value of the second cell being greater than or equal to a first threshold;
   a reference signal receiving quality (RSRQ) value of the second cell being greater than or equal to a second threshold;

a signal to noise ratio (SNR) of the second cell being greater than or equal to a third threshold; or no radio link failure (RLF) existing in the second cell within a preset duration.

6. A cell access method, performed by a first network device and comprising:
    sending configuration information of a second cell to a user equipment (UE) in a case that the UE accesses a first cell, wherein the configuration information of the second cell is used for the UE to access the second cell, the first cell is a service cell of the first network device, and the second cell is a service cell of a second network device communicating with the first network device;
    receiving first indication information sent by the UE, and maintaining data transmission in the first cell according to the first indication information, wherein the first indication information is used for indicating that the UE has not completed accessing the second cell; and
    receiving second indication information sent by the UE, and switching a data transmission path from the first cell to the second cell according to the second indication information, wherein the second indication information is used for indicating that the UE has successfully accessed the second cell.

7. The method according to claim 6, wherein the sending the configuration information of the second cell to the UE comprises:
    sending a reconfiguration message to the UE, the reconfiguration message comprising the configuration information of the second cell;
    the receiving first indication information sent by the UE comprises:
    receiving a reconfiguration complete message sent by the UE, the reconfiguration complete message comprising the first indication information; and
    the receiving second indication information sent by the UE comprises:
    receiving a cell access complete indication message sent by the UE, the cell access complete indication message comprising the second indication information.

8. The method according to claim 6, wherein the first indication information is a boolean field and a value of the boolean field is a first value.

9. The method according to claim 6, wherein the second indication information is a cell access complete indication cause field and a value of the cell access complete indication cause field is a second value.

10. A user equipment (UE), comprising a processor, a memory and a computer program stored in the memory and executable on the processor, wherein the UE communicates with a first network device, the first network device communicates with a second network device, and the computer program, when executed by the processor, causes the UE to perform:
    receiving configuration information of a second cell sent by the first network device in a case that the UE accesses a first cell, wherein the first cell is a service cell of the first network device, and the second cell is a service cell of the second network device;
    according to the configuration information of the second cell, sending first indication information to the first network device and executing a process of accessing the second cell, wherein the first indication information is used for indicating that the UE has not completed accessing the second cell, and the first indication information is used for the first network device to maintain data transmission in the first cell; and
    sending second indication information to the first network device in a case that the UE has successfully accessed the second cell and the second cell satisfies a preset condition, wherein the second indication information is used for indicating that the UE has successfully accessed the second cell, and the second indication information is used for the first network device to switch a data transmission path from the first cell to the second cell.

11. The UE according to claim 10, wherein the computer program, when executed by the processor, causes the UE to perform:
    receiving a reconfiguration message sent by the first network device, the reconfiguration message comprising the configuration information of the second cell;
    sending a reconfiguration complete message to the first network device, the reconfiguration complete message comprising the first indication information; and
    sending a cell access complete indication message to the first network device, the cell access complete indication message comprising the second indication information.

12. The UE according to claim 10, wherein the first indication information is a boolean field and a value of the boolean field is a first value.

13. The UE according to claim 10, wherein the second indication information is a cell access complete indication cause field and a value of the cell access complete indication cause field is a second value.

14. The UE according to claim 10, wherein the preset condition comprises at least one of following:
    a reference signal receiving power (RSRP) value of the second cell being greater than or equal to a first threshold;
    a reference signal receiving quality (RSRQ) value of the second cell being greater than or equal to a second threshold;
    a signal to noise ratio (SNR) of the second cell being greater than or equal to a third threshold; or
    no radio link failure (RLF) existing in the second cell within a preset duration.

15. A network device, being a first network device and comprising a processor, a memory and a computer program stored in the memory and executable on the processor, wherein the computer program, when executed by the processor, causes the first network device to perform steps of the cell access method according to claim 6.

16. The network device according to claim 15, wherein the computer program, when executed by the processor, causes the first network device to perform:
    sending a reconfiguration message to the UE, the reconfiguration message comprising the configuration information of the second cell;
    receiving a reconfiguration complete message sent by the UE, the reconfiguration complete message comprising the first indication information; and
    receiving a cell access complete indication message sent by the UE, the cell access complete indication message comprising the second indication information.

17. The network device according to claim 15, wherein the first indication information is a boolean field and a value of the boolean field is a first value.

18. The network device according to claim 15, wherein the second indication information is a cell access complete indication cause field and a value of the cell access complete indication cause field is a second value.

19. A non-transitory computer-readable storage medium, storing a computer program, wherein when the computer program is executed by a processor, steps of the cell access method according to claim 1 are implemented.

20. A non-transitory computer-readable storage medium, storing a computer program, wherein when the computer program is executed by a processor, steps of the cell access method according to claim 6 are implemented.

* * * * *